(12) United States Patent
Winterbottom

(10) Patent No.: US 6,987,838 B2
(45) Date of Patent: Jan. 17, 2006

(54) SYSTEM AND METHOD FOR DEPLOYING NEW EQUIPMENT AND SERVICES IN CONJUNCTION WITH A LEGACY PROVISIONING SYSTEM

(75) Inventor: Philip Winterbottom, San Jose, CA (US)

(73) Assignee: Entrisphere, Inc., Santa Clara, CA (US)

( * ) Notice: Subject to any disclaimer, the term of this patent is extended or adjusted under 35 U.S.C. 154(b) by 385 days.

(21) Appl. No.: 10/417,381

(22) Filed: Apr. 16, 2003

(65) Prior Publication Data

US 2004/0208292 A1    Oct. 21, 2004

(51) Int. Cl.
H04M 1/24 (2006.01)
H04M 3/08 (2006.01)
H04M 3/22 (2006.01)

(52) U.S. Cl. ............... 379/15.03; 379/1.04; 379/22.04; 379/27.01; 379/28; 379/29.08

(58) Field of Classification Search ............... 379/1.03, 379/1.04, 9.02, 15.03, 22.04, 27.01, 28, 29.08
See application file for complete search history.

(56) References Cited

U.S. PATENT DOCUMENTS

| 5,650,994 A | * | 7/1997 | Daley ......................... 370/259 |
| 6,459,702 B1 | * | 10/2002 | Saaverda et al. ........... 370/422 |
| 2003/0012183 A1 | | 1/2003 | Butler et al. |

OTHER PUBLICATIONS

International Search Report issued for PCT/US2004/011703, dated Aug. 05, 2004,

* cited by examiner

Primary Examiner—Duc Nguyen
(74) Attorney, Agent, or Firm—Fulbright & Jaworski LLP

(57) ABSTRACT

In one embodiment, a new device or service can be treated as an abstraction, allowing a model to be created which mimics operation of the device or service, but which does not physically exist. A communication system may then take physical assets that are distributed around a network, such as circuit packs with ports on them, and virtually plug them into a shelf that does not physically exist. A legacy system preferably continues to function as it always has and the abstraction mediates between the legacy operations support systems, the virtual machine and the physical reality. This then allows for the continued use of existing operation systems to manage new network architectures with services different from those originally contemplated by the legacy operations support systems.

15 Claims, 5 Drawing Sheets

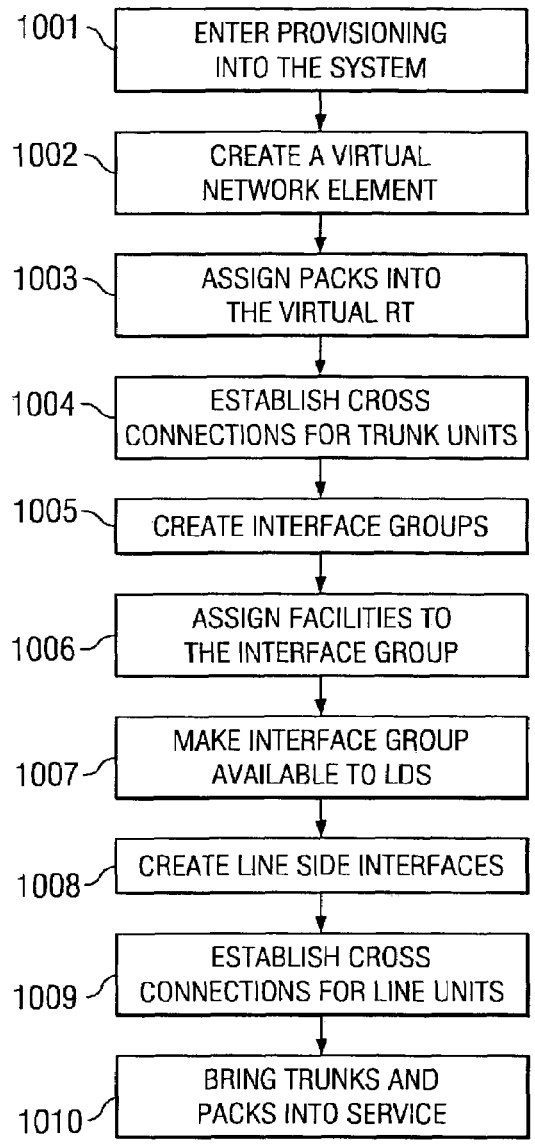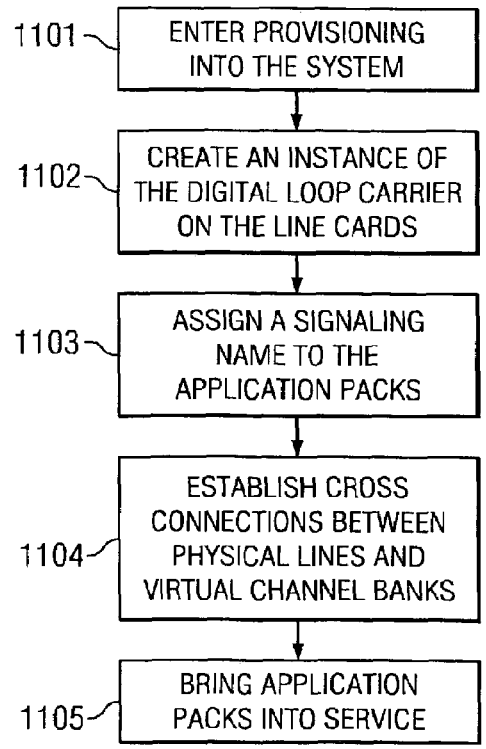

SYSTEM AND METHOD FOR DEPLOYING NEW EQUIPMENT AND SERVICES IN CONJUNCTION WITH A LEGACY PROVISIONING SYSTEM

TECHNICAL FIELD

This invention relates to communication network systems and more particularly to deploying new products and services in conjunction with traditional management provisioning systems.

BACKGROUND OF THE INVENTION

Large networks, such as communication networks, must be able to deploy and implement new services cost effectively. These systems are complex by their very nature and often rely on a set of operation systems that sit in the back office of a carrier and control the flow of provisioning and maintenance commands that ultimately actually manage the network plant, i.e. the physical equipment.

The provisioning flow often starts with a customer request, as taken by a customer service representative, and moves through a service management layer, into a network management layer and ultimately to the physical equipment. This system allows a carrier to process and implement orders for service in an orderly manner. Because of the large volume of such orders, efficient processing is generally mandatory.

Operating in tandem with the ordering systems are adjunct systems that perform maintenance, provide correlation (e.g., phone number correlation with respect to accounts and/or physical equipment) and attend to the general health of the network. Such adjunct systems, for example, monitor and service the network, collect alarms, and suggest corrective actions in the presence of faults. Also operating in conjunction with the provisioning systems are business operation systems; such as billing which allows the carrier to realize revenue from the provisioning of its services.

Collectively, these systems are called operations support systems (OSS), and they form a large part of the operational assets of the business. These systems have been installed over time and represent a present method of doing business. The interaction of the various points of the system are complex and the overall invested capital in the system is large. It should be appreciated that is not simply the systems themselves that are complex, but the system databases contain information as to how a carrier does business. For example, the databases contain the topology of network interconnection, the equipment inventory, the subscriber database, and the subscriber services database. These are very large databases that represent a carrier's ability to deal with its customers and its network.

Looking at the evolution of carrier networks over the last 20 years, there has been little innovation in terms of how and what services are offered by these carriers. Most of the bottom line revenue of large carriers today is generated from TDM services, such as, T1s, DS1s, and analog voice. The equipment which has delivered those services has remained very similar over this time period. Typically, this equipment includes class 5 switches, digital cross-connect systems, digital loop carriers, and SONET transport equipment. The operating companies (primarily the regional Bell operating companies (ROBCs)) have gone through several incremental evolutions of that equipment, but the fundamental model of how service is delivered and what service is delivered has remained fairly static. Even new services such as broad-band delivery of DSL over copper, roughly fit the traditional model and only requires incremental changes to the operations support systems for proper operation.

Today there is a trend toward offering converged equipment that is not based on a TDM model, but rather is based on packet switching, whether it be IP or ATM. This new equipment is capable of delivering the traditional services, but it also provides a platform for delivering new services. Typically such converged products have seen little significant deployment in large carriers because their method of operation has not been compatible with the deployed back office systems due to their novel architecture. Thus, a problem exists when it is desired to introduce into the traditional operating environment equipment and/or services which operate in a manner unknown to the legacy operations support systems.

Currently, devices and services which are not consistent with existing carrier operations support systems are being implemented by competitive local exchange carriers (CLECs), many of which have failed. These CLECs have been able to deploy new devices and services because they did not have legacy operations support systems to contend with. In fact, one reason for such failures could possibly be that the CLECs were unable to scale their businesses because they did not employ robust operations support systems. This follows because efficiency in the communications business is achieved by scale and repeatability. If the back-office can not support scaling, it might be able to introduce new devices and services quickly, but at the expense of loss of management control, which would include installation, maintenance, trouble locating and billing.

BRIEF SUMMARY OF THE INVENTION

The present invention is directed to systems and methods which take advantage of the realization that in legacy operations support systems the equipment is inventoried physically. It is the physical correlation of equipment (such as line cards) and the services represented by the equipment that controls the efficient operation of the system. This correlation tells the system that a piece of equipment exists in a central office or in a cabinet out in the field. It also tells the system everything the system needs to know about the proper operation of the service provided by that piece of equipment.

In one embodiment of the invention, the new device or service can be treated as an abstraction, allowing a model to be created which mimics the operation, but which does not really exist. The system then takes physical assets that are distributed around the network, such as circuit packs with ports on them, and virtually plugs them into a shelf that also does not exist. The legacy operations support systems then manage the abstraction as if it were real. Thus, the legacy system continues to function as it always had and the abstraction mediates between the legacy operations support systems, the virtual machine (e.g., virtual network element (VNE)) and the physical reality. This then allows for the continued use of existing operations support systems to manage new network architectures with services different from those originally contemplated by the legacy operations support systems. In this manner, the present method of doing business, is maintained across the board and the proper provisioning reports are generated and the proper billing procedures are followed.

According to embodiments of the invention, the aforementioned abstractions or virtual machines are integrated into existing operations support systems, rather than integrating a physical description of the actual hardware assets. Accordingly, legacy operations support systems may be made to readily accommodate new equipment and/or services. Embodiments of the present invention provide robust provisioning, operations, and maintenance with respect to equipment not otherwise directly supported by existing operations support systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 10 shows steps performed in configuring the central office terminal side of the exemplary configuration of FIG. 8 according to an embodiment of the present invention; and FIG. 11 shows steps performed in configuring the remote terminal side of the exemplary configuration of FIG. 8 according to an embodiment of the present invention.

DETAILED DESCRIPTION OF THE INVENTION

Figure 1:
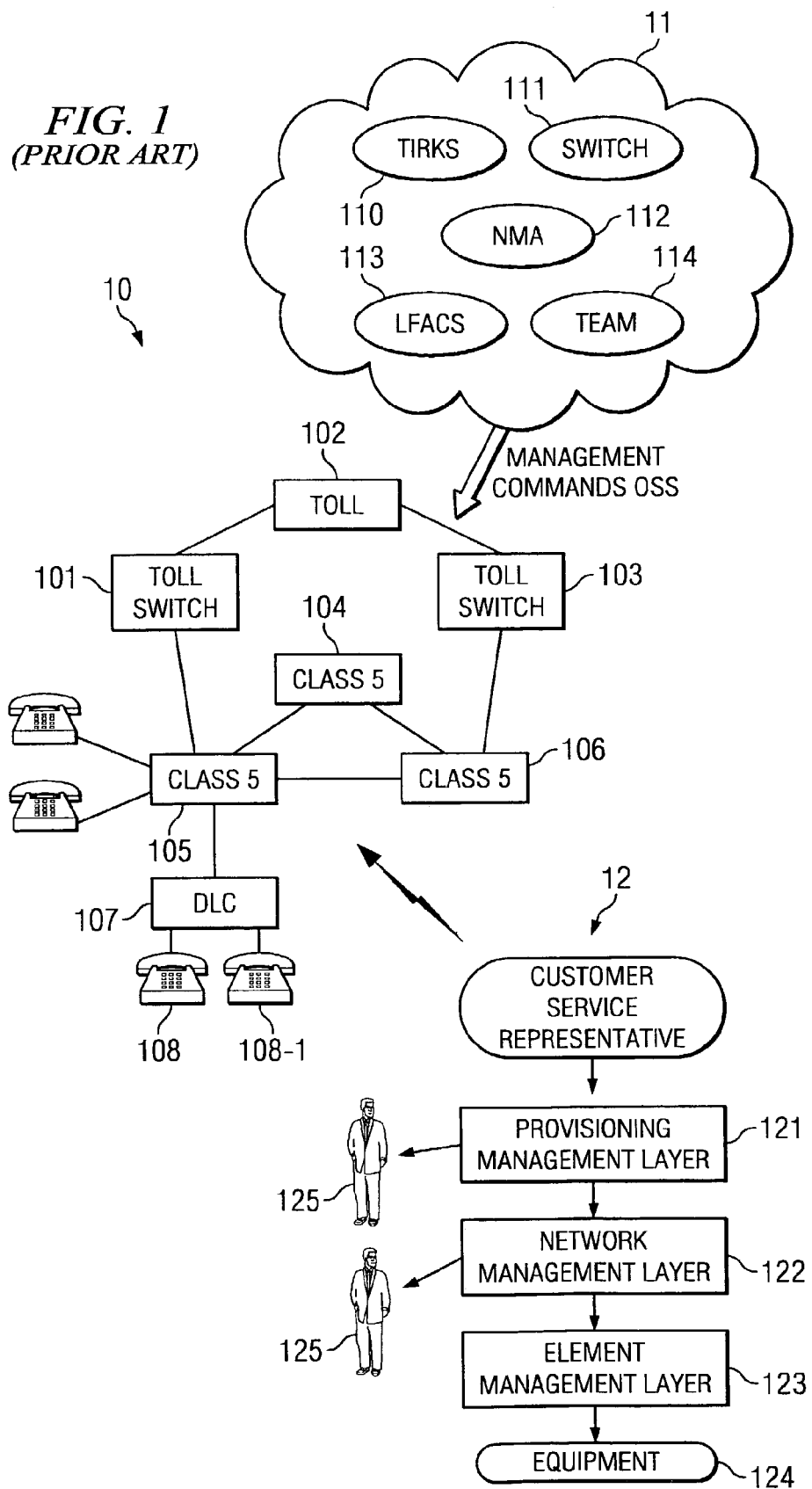
FIG. 1 is an overview of prior art legacy provisioning systems.

FIG. 1 is an overview of a prior art legacy operations support system and shows three distinct aspects; namely physical apparatus 10 of the network, the operations support systems 11 which manage network 10; and flow 12 which shows the operation of the system from customer service to actual equipment.

Network apparatus 10, which is a high level view of the current implementation of a telephone network, shows a set of switches 101, 102, 103, 104, 105 and 106. The class 5 switches, such as switches 104, 105, 106, implement local service and serve to connect subscribers, such as subscribers 108 and 108-1 together. An increasing trend starting in the early 80's has been to connect subscribers to remote line termination units called digital loop carriers, such as DLC 107. DLC 107 provides a direct interface for a variety of services to subscribers 108 and 108-1.

In operation, if subscriber 108 makes a call, its line is terminated by DLC 107 and the service for the call is implemented by the class 5 switches, 105, 104 and 106, if the call is local. For a toll (long distance) call, switches 101, 102, 103 provide connectivity between the local offices. In order to make a local subscriber call work, the equipment and services available to that subscriber must be provisioned. This provisioning controls order fulfillment and billing, which are the main functions of the network service provider. This provisioning generally must be applied to all of the network elements, including DLC 107, the class 5 and class 4 switches, as well as several other pieces of equipment (not shown). The number of pieces of equipment that must be provisioned properly is typically large. For example, one carrier today operates approximately 60 million subscriber loops, and may have as many as four thousand class 5 switches.

Collectively, there is a set of software, shown in cloud 11, which the carrier calls its operations support systems. There are different layers and levels to these operations support systems. At a top layer there are a set of customer service, customer relation and customer management tools which are processed to create orders. Below that layer there is a set of network management tools which deal with the inventory. These control how many ports, how many lines, how many facilities, how many switches, etc., are to be used. Below that level there is a set of element management software which deals directly with the equipment hardware.

An exemplary set of operations support systems (operations support system 11) deployed in North America under the collective umbrella of Operations System Modifications for the Integration of Network Elements (OSMINE) include the trunk inventory system, TIRKS 110, which is a mid-level system that does trunk inventory and assignment. The TIRKS system connects together pieces of equipment and monitors and tracks the facilities which connect together pieces of equipment. Also included is a transport and activation management system (TEAM) 114 which, driven by TIRKS makes connections between pieces of equipment using facilities which are allocated by TIRKS. Loop inventory system, (LFACS) 113, tracks the individual assignment of customer subscriber loops. LFACS documents an inventory of the association between copper pairs from DLC 107 to subscribers 108, 108-1. LFACS also documents the connections between DLC 107 and switch 105. At a higher level, network monitoring and alarming (NMA) 112 collects trouble reports from the network elements as facilities fail, and as problems arise. The NMA system collects together alarming and reporting information, so that the carrier can observe problems at a network level. There is also a system called SWITCH 111 which implements and provisions the subscriber level features via switches 104, 105 and 106. The SWITCH system provisions and manages specific features, such as the telephone number of a subscriber loop between switch 105 and subscriber 108 and takes into account whether or not DLC 107 is in place. Features in this case might include three-way calling, call hold, voice mail, caller ID, call blocking, and the like. Together the systems of operations support system 11 substantially as set forth above, come under the umbrella of a Telcordia product called OSMINE and are the backbone operations support systems of most North American carriers. The OSMINE system is hereby incorporated by reference herein.

The combination of equipment layout shown by elements of network 10 with the control systems shown with respect to operations support system 11 results in call flow 12 from customer service requests and reports to the actual provisioning of the equipment. Most operations begin with a customer service system (either live via a customer service representative or over an on-line connection) collecting data which then must be processed. This data either forms a work order request for new or altered service or establishes a fault condition. The work request is injected into provisioning management layer 121, such as may comprise a virtual front office, service gate, or customer manager of operations support system 11 as are known in the art. The provisioning management layer is designed to understand the service level provisioning of the provider's network and is able to generate a set of requests which are then processed by network management layer 122, such as may comprise a trouble ticket manager, NMA, network performance monitor, or service level manager of operations support system 11 as are known in the art. This layer has a global view of the services which are required to turn on that particular service.

For example, assume it is required to establish a two wire analog service to subscriber 108. The order would flow through provisioning management layer 121, and network management layer 122 to element management layer 123, such as may comprise the ENTRIVIEW product available from Entrisphere, Inc., Santa Clara, Calif. Management layer 123, via equipment layer 124, would allocate a loop and, under control of LFACS 113, allocate a loop. The subscriber loop number would then be delivered to operations support systems switch 111. The switch would then issue a provisioning command to class 5 switches 104, 105 and 106 to identify subscriber 108 to the world. At the same time, layers 121, 122, 123, and 124 would flow provisioning through the class 5 switches to DLC 107. This, in turn, would turn up service for customer 108.

Concurrently with that turn up, element management layer 123 interfaces with network monitoring and alarming system 112 (NMA), such that provisioning and fault information is visible at the network level and, if necessary distilled to customer service representatives 125 so that he/she can track trouble in the network both during provisioning and during ongoing operations.

There is a synergy between all these systems and they are interconnected so that they share data to achieve the provisioning and management of the network. Collectively, these systems represent a huge asset to the business of the carrier and an important aspect of this invention is the ability to reuse those systems, even as the equipment and functions changes.

Figure 2:
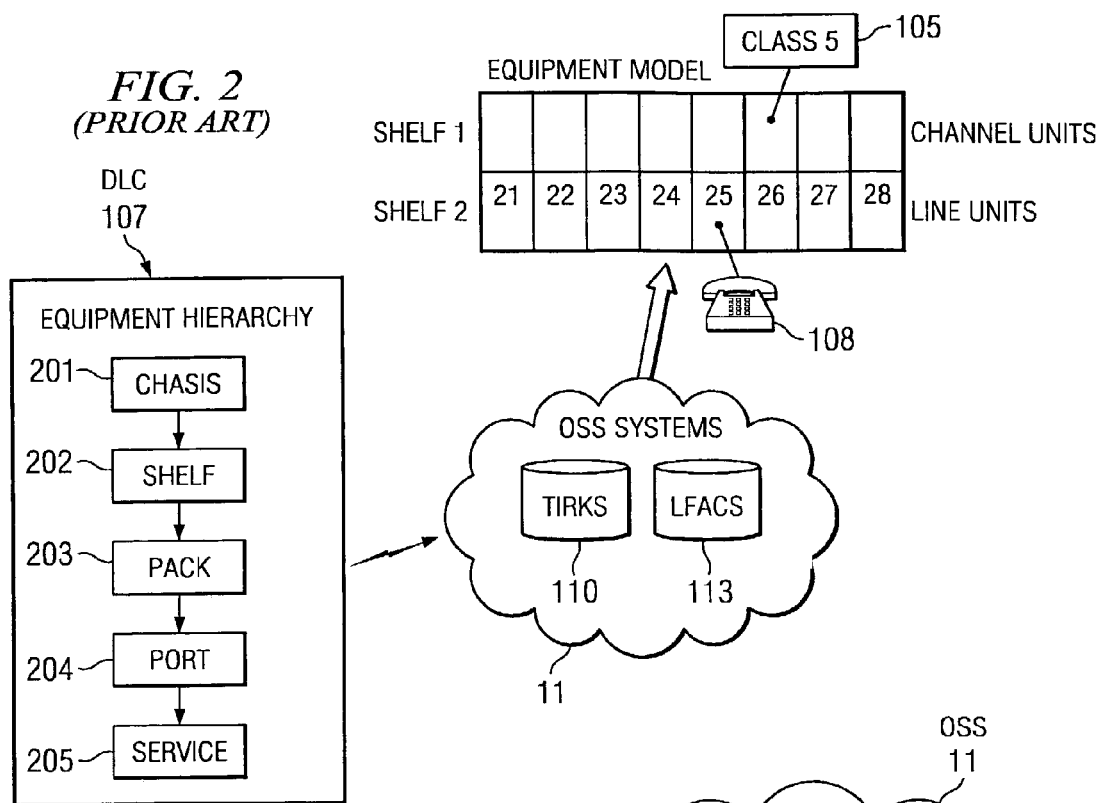
FIG. 2 is a more detailed view of prior art legacy provisioning systems with respect to a particular service or equipment hierarchy.

FIG. 2 is a more detailed view of the prior art by which a piece of equipment, for example, DLC 107, is represented. Thus, elements 201, 202, 203, 204, and 205 are the physical model by which DLC 107 is seen by the operations support systems. This is the equipment model, and part of a vendor's development program is the integration of its platform into the operations support systems of the carrier. The equipment is modeled today in a physical fashion in accordance with Telcordia OSMINE systems and the operations support systems collectively see a piece of equipment as a set of physical assets. DLC 107 is a piece of access equipment that sits between class 5 switch 105 (FIG. 1) and subscriber 108. Typically, such a piece of equipment consists of a number of chassis 201 and perhaps a set of shelves 202. Within a shelf there are a set of service packs 203, each having many ports 204, and a set of common equipment that manages those service packs. The net result is service 205 is provided to a subscriber.

In a typical DLC, as depicted by FIG. 2, there are two shelves (shelf 1 and shelf 2). One shelf serves the channel units and connects the trunk side of the subscriber interface to switch 105. This allows information to flow from the network into the DLC. The other shelf provides application service packs 21, 22, 23, 24, 25, 26, 27, and 28 which connect the DLC to specific subscribers. In this example, pack 25 connects shelf 2 to subscriber 108. Pack 25 is associated with class 5 switch 105, and there may be more than one network termination on shelf 1, although there usually is not.

In operation, TIRKS 110 (FIG. 2) inventories the trunk (shelf 1) side and LFACs (FIG. 1) inventories the loop (shelf 2) side. These control systems are the foundation of the operating company's ability to manage and turn up service. A request from the provisioning management layer, layer 121 of FIG. 1, is a request for service to subscriber 108. That order flows into an inventory system, such as LFACs and TIRKS, to request that an available port physically close to the subscriber be made available to that subscriber. From that request TEAM 114 (FIG. 1) makes the connections through the equipment from subscriber 108 to switch 105. As discussed above, this is a flow-through provisioning model that allows service to be turned up, essentially, autonomously after the wires have been connected.

Figure 3:
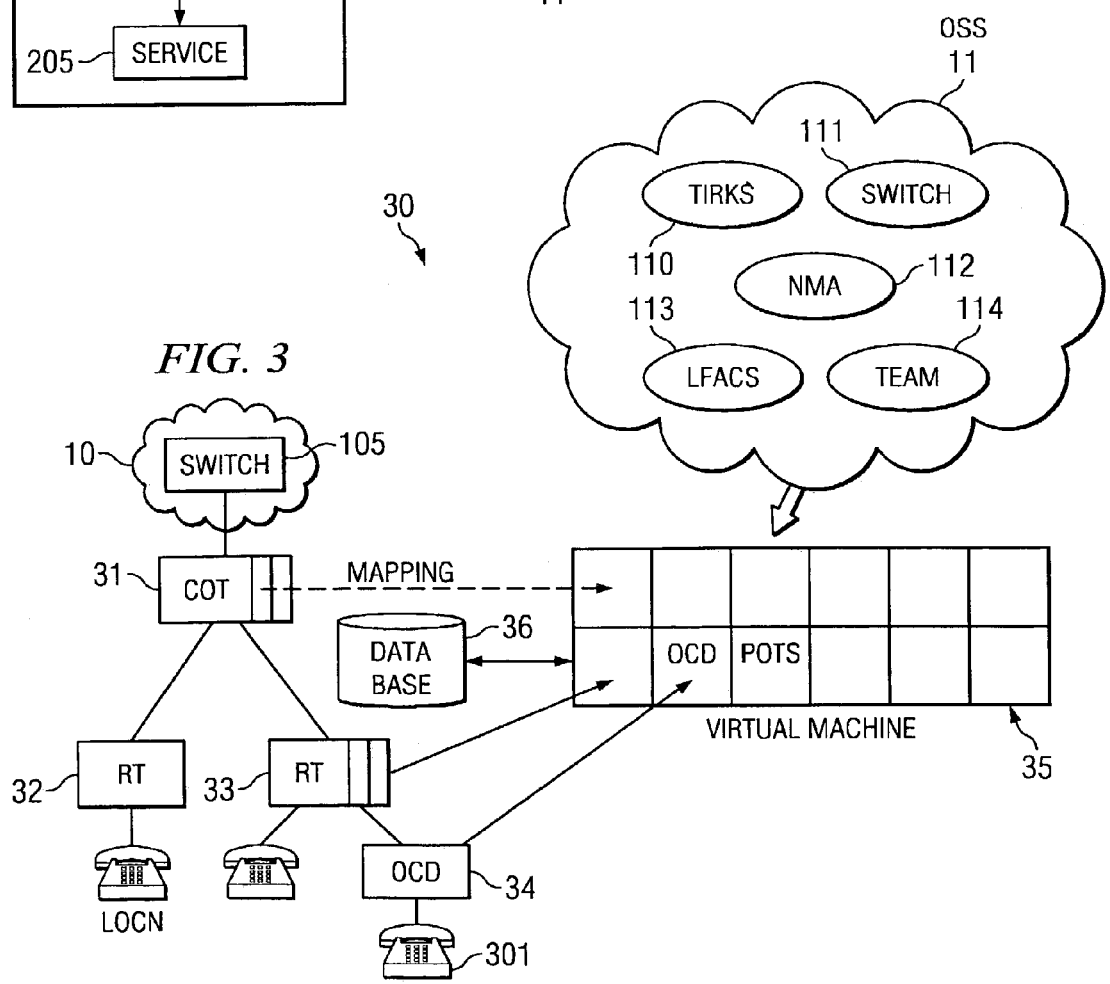
FIG. 3 shows one embodiment of the equipment hierarchy of the present invention.

FIG. 3 shows one embodiment of the invention with respect to a complex access network implementing services substantially as described above, although facilitating the use of new equipment. It is desired to deliver multiple services that are physically distributed around the network using new network topology. The challenge is to take both the new services and the new network topology and enable the existing operations support system to provision the network as it always has, using the same mode of operation as before. This allows the carrier to save costs because they don't have to redesign their operations support systems and they don't have to retrain their service personnel. Thus using the concepts of the invention, the chain from customer service to element management remains unchanged, even though both the implementation and the geography of the services has changed.

In order for a carrier to continue to evolve, and for carriers to continue introducing new revenue bearing services, they typically must introduce new technology into the network. So there may be new access methods, an example of which might be an optical concentration device 34 as shown in FIG. 3. Assuming OCD to be new, and assuming there is no model in the current operations support systems, then provisioning is impossible. There are other kinds of access, voice over DSL, wireless, and the like, all of which share the same problem. That is, there is no equipment model currently in use that allows those newer access methods to be represented and managed by the current operations support systems.

This problem is solved by a software abstraction shown in FIG. 3 as virtual machine 35. In the system discussed above, with respect to FIG. 2, DLC 107 is a physical piece of equipment with a chassis, a shelf, pack and a port. In the embodiment of the invention, as shown in FIG. 3, there are still ports and packs connected into remote terminals (RTs) 32 and 33, but one or more of these assets are mapped into virtual machine 35 in a manner so that under conventional provisioning control the system can take physical assets from anywhere in the geography of the sub-network (that is anywhere on equipment 31, 32 and 33), and provision it, via a shelf which does not exist. This then allows for the assembly of a set of resources which are in diverse positions in the network. This will work for provisioning equipment which does not fit the conventional model.

In operation according to a preferred embodiment, as viewed by the provisioning network, the new equipment has the same properties as the prior art piece of equipment, such as DLC 107, but in reality has different characteristics. The legacy commands from the established network are translated into commands understood by the new equipment via the virtual machine such that the existing operations support systems are managing a familiar, well understood equipment model, when, in fact, they are not. In essence, the original provisioning system is seeing a familiar piece of hardware, but managing a new style network. The advantage of the abstraction is that the same provisioning can manage both exiting networks as well as new networks.

When suppliers have added new services and/or new equipment in the past, they have either tried to modify the legacy operations support system or a portion onto it. Because of the operations support system complexity, these "grafted" fixes have not worked. Thus, using the approach of the present invention, the actual physical arrangement of the hardware is hidden from the operations support system so that new network elements and new services can be added into the network without modifying the operations support system.

One implementation of the inventive concept includes configuration database 36 which is a provisioned entity within a network element whereby, when the equipment is installed, a set of virtual network elements are provisioned, that is created inside the provisioning database of the network element. For example, assume a sub-network of access elements, 31, 32 and 33 in FIG. 3. At install time, virtual machine 35 is created by issuing a provisioning command to the network element. In the example, a command would be to create a virtual DLC, which is a named DLC that has no physical presence, but the operations support system believes it actually exists. Within the virtual machine, service packs representing service, such as 31, 32, 33, and 34 are assigned.

By issuing those provisioning commands, that is, telling the operations support system where each virtual pack is located, the operations support system will create database entries which document the topology of the virtual machine, all the while thinking it is an actual piece of equipment it is dealing with. The operations support system, thus, is fooled into "knowing" which ports and services are available at locations 31, 32, 33, and 34.

At that point when a physical provisioning request comes in, such as turn up service to subscriber 301, operations support system is able to select the pack (35-1) in virtual machine 35 that is closest to the subscriber and ascertains that there is a free port on that pack available to deliver the required service. Then the operations support systems issue a command to provision that service which references the virtual entity 35-1 that is being provisioned into machine 35. The provisioning command that was issued against the virtual network element is interpreted by virtual machine 35 and the proper service is turned up to designated subscriber 301 via RT 33 and OCD 34.

In the arrangement in the prior art, the operations support system command would not be a translation. It would be the physical command to implement the service in the actual hardware. In the embodiment described, the single provisioning command, or a small set of provisioning commands, is translated by virtual machine provisioning database 36. The configuration database determines how to turn up the desired service from the legacy provisioning command and maps the legacy command into a set of commands which are appropriate for elements 31, 32, 33, and 34.

It should be appreciated the embodiments of the present invention provide for both new services and/or new delivery methods. Thus, embodiments of the invention could have a new service delivered by an old technology or delivered by a new technology. Likewise, embodiments of the invention could have an old service delivered by a new technology. For example, subscriber 301 (FIG. 3) could be connected to a completely new class of hardware on a different type of access network that has different capacity and planning rules, and that has a different physical implementation. The actual end service could still be delivered by two wire copper.

For example, OCD 34 is a fiber connected concentration device for which there is no real analog in the operation support system. OCD 34 fundamentally delivers two-wire service to subscriber 301, but does so by concentrations of fiber, not by line cards and service ports in a rack. Virtual machine 35 is a virtual service pack such that the operations support system can turn up service to subscriber 301 without the operations support system even knowing what the equipment looks like physically. This system then allows a carrier to evolve its network to use new access methods, and new networking equipment without changing the way it operates.

As discussed above, the value of the operations support system is its ability to allow a carrier to scale and manage a very large operation efficiently. These systems allows large carriers, serving millions of customers with perhaps millions of lines, to provide communication services economically. For example, these large carriers have huge inventories of equipment, such as to service sixty million subscriber lines by implemented physical pieces of hardware, and therefor there will be a substantial amount of breakage (faults) on a day to day basis, each requiring fixing. One of the values of an operations support system is that it is able to correlate between a trouble report and a specific piece of equipment. These trouble reports can come from system monitors or from the subscribers, and the network should have the ability to take inventory and provisioning information that represents and embodies the connection of pieces of equipment or services to a subscriber, and based on the available fault information, determine what the service impact is within the network.

Figure 4:
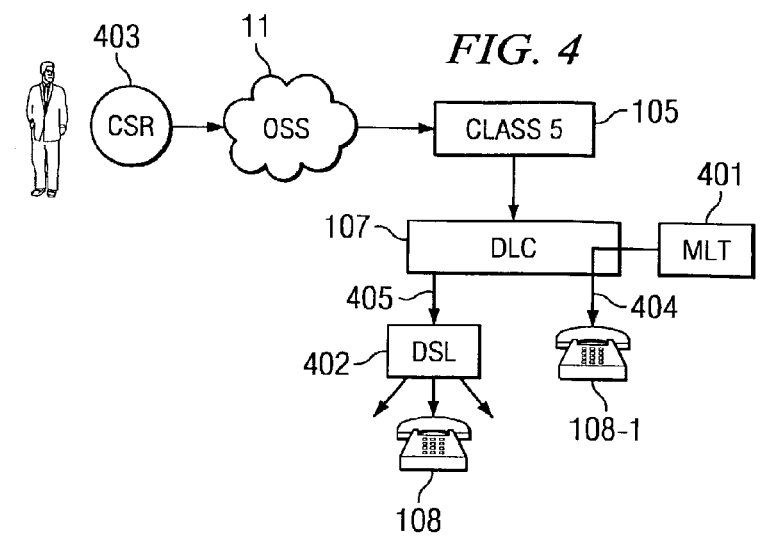
FIG. 4 shows one embodiment of a load test.

One important test is a loop test where a customer service representative accesses the network from a customer service station location somewhere in the network to determine what problems exist for a particular subscriber. FIG. 4 shows one embodiment of a loop test where customer service representative (CSR) 403 issues a loop test command via operations support system 11 to test the loop for subscriber 108-1. This loop test command flows through network 10 (FIG. 1) and is ultimately sent to the correct class 5 switch 105 which in turn dispatches the test request to the equipment that implements the line termination. In this example, it is digital loop carrier 107. The digital loop carrier can test the loop using loop test unit 401 to determine whether copper line 404 to subscriber 108-1 is shorted, whether it is disconnected, whether it is permanently off hook, etc. The results of that test are sent back to CSR 403, allowing the CSR to take corrective action. The operations support system correlates information from all of the pieces of equipment that are involved in that chain, which could include toll switches, 101, 102 in FIG. 1, class 5 switches 104, 105 and DLC 107 as well as the line to subscriber 108-1 even though that line is actually connected to digital loop carrier 107.

However, instead of subscriber 108-1 being connected to DLC 107, assume that a new service has been introduced in which two-wire voice is being delivered over DSL 402 to subscriber 108. This could be a voice over packet application where the operations support system does not know how the physical two-wire line to subscriber 108 is implemented. In fact, in the example, the voice service is converted into data, routed to the loop carrier, and is then terminated in the loop carrier as data and not as a traditional analog line. In the DLC, the data is split from the voice portion of the network. From an operations support system standpoint, voice and data are different services, but here voice is part of a data line. Loop testing in the traditional way will not yield valid results.

Assume now that subscriber 108 has a problem and CSR 403 orders a loop test. Switch 105 is able to deduce that subscriber 108 is connected to DLC 107. But, since a new service has been implemented to convert voice data and share the DSL line and perhaps have multiple subscribers served by DSL 402, the loop test will fail. This failure results because, as discussed, there is no longer an analog path to subscriber 108.

Thus, in order to determine if a problem exists, and if so, the nature of the problem, a complex set of questions must be asked and answered. The operations support system does not know these questions because its programming was set perhaps twenty years ago. Virtual machine 35 (FIG. 3) allows for the representation of phone line 405 as a service pack. Therefore, the port that connects subscriber 108 to DSL 402 has a virtual presence at the location within machine 35 that the operations support system expected. The operations support system issues its orders to that shelf, and machine 35 takes that request and translates it into a new set of questions appropriate for DSL 402. These questions are then used to test the proper "data" connection to subscriber 108 even though the subscriber is asking about voice communications. Machine 35 returns the results in a form understood by the operations support system. Thus, the operations support system can be told it is a copper problem when, in fact, it was a failure of a DSL line, which the operations support system would not understand.

Figure 5:
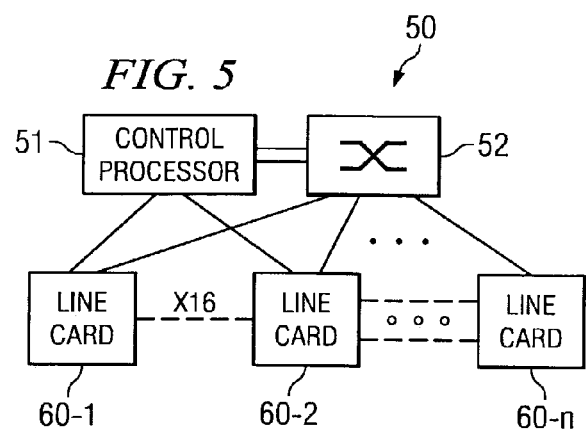
FIG. 5 shows a diagram of one physical implementation of a piece of equipment.

FIG. 5 is a diagram of one physical implementation of hardware 50, such as may correspond to any of elements 31, 32, and 33 of FIG. 3, configured to support software operable to define virtual machines according to embodiments of the present invention. Hardware 50 of FIG. 5 comprises a new access network present in switch 52, which allows the switching of data between service packs, 60-1 to 60-$n$, such that information can be routed from the subscriber service ports to network side service ports that actually provide that service. In turn, control processor 51, configures and drives switch 52. Control processor 52 is the master processor for virtual machine 35 (FIG. 3) and allows for the interface with the operations support system. Service packs 60-1 to 60-$n$ provide connections both to the network and to the subscriber.

Figure 6:
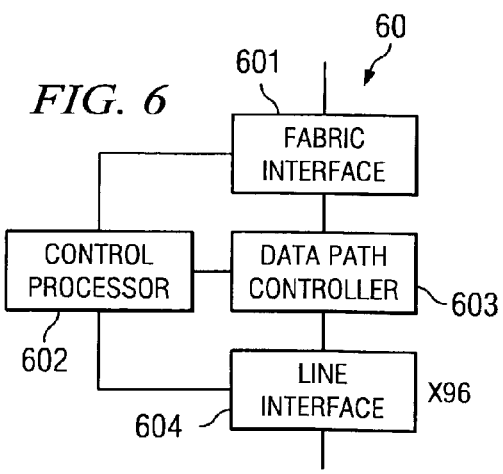
FIG. 6 shows one embodiment of a service pack implementation.

FIG. 6, shows physical implementation 60 of a service pack where physical line interface 604 has a connection to data path controller 603, which implements the mapping of services into the switch fabric, as controlled by fabric interface 601. Fabric interface 601 formats the data which is routed to another line pack. Control processor 602 communicates with master control processor 51 (FIG. 5) for the implementation of services. Local control processor 602 on each line service pack controls its line cards, and issues commands to the individual elements on that pack for the provisioning of service.

Configuration database 36 (FIG. 3) is, in one embodiment, maintained by control processor 51. Provisioning commands flow into the virtual machine through one or more of the service packs and are sent to control processor 51 and then routed to the proper local processor 602 where they are implemented in terms of what the commands mean in terms of the local service packs. The local service packs then actually implement the turn up and connection of services. Control processor 602, working in cooperation with control processor 51, sets up the proper provisioning and then, when necessary, controls the proper testing, such that the service can be implemented by the new hardware. Note that flow of provisioning commands may also flow out of the equipment to adjunct pieces of equipment, such as optical concentration device (OCD) 34 in (FIG. 3). This allows the services to the subscriber connected to that OCS to be set-up in the same way as a subscriber that is directly connected to a service pack.

Figure 7:
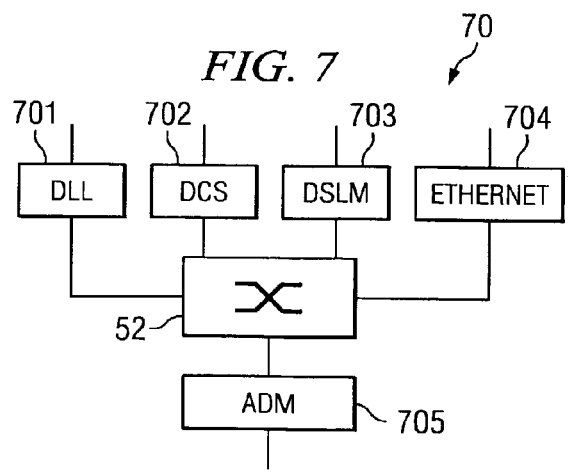
FIG. 7 shows how a single piece of equipment is viewed by a provisioning network.

FIG. 7 shows how a single machine embodied by systems 50 and 60 (FIGS. 5 and 6) is viewed by the network as a set of virtual network elements that provide different services. By way of example, FIG. 7 shows that information is shared by virtual machines 701–704 via switch fabric 52 (FIG. 3). The information is shared via switch fabric 52 (FIG. 5). DLC 701 is a loop carrier function, and DCS 702 serves as a digital cross-connect function which allows for fractional T1 and DS1 services. Virtual digital subscriber line multiplexer (DSLAM) 703 allows for DSL services, while ethernet multiplexer 704 provides ethernet services. This system allows for the creation of elements 701, 702, 703 and 704 in software to provision those elements within operations support system 11 as traditional network elements.

Having shown systems and their configuration according to embodiments of the present invention, exemplary provisioning procedures for virtual network elements (VNEs) according to a preferred embodiment is provided herein below. VNE provisioning according to an embodiment of the present invention comprises three phases as follows: 1. Mapping resources from local and remote machines to build a virtual remote terminal; 2. Provisioning the virtual remote terminal to support a number of interface groups; and 3. Configuring the embedded overhead channel (EOC) to enable flow-through provisioning from operations support systems.

Figure 8:
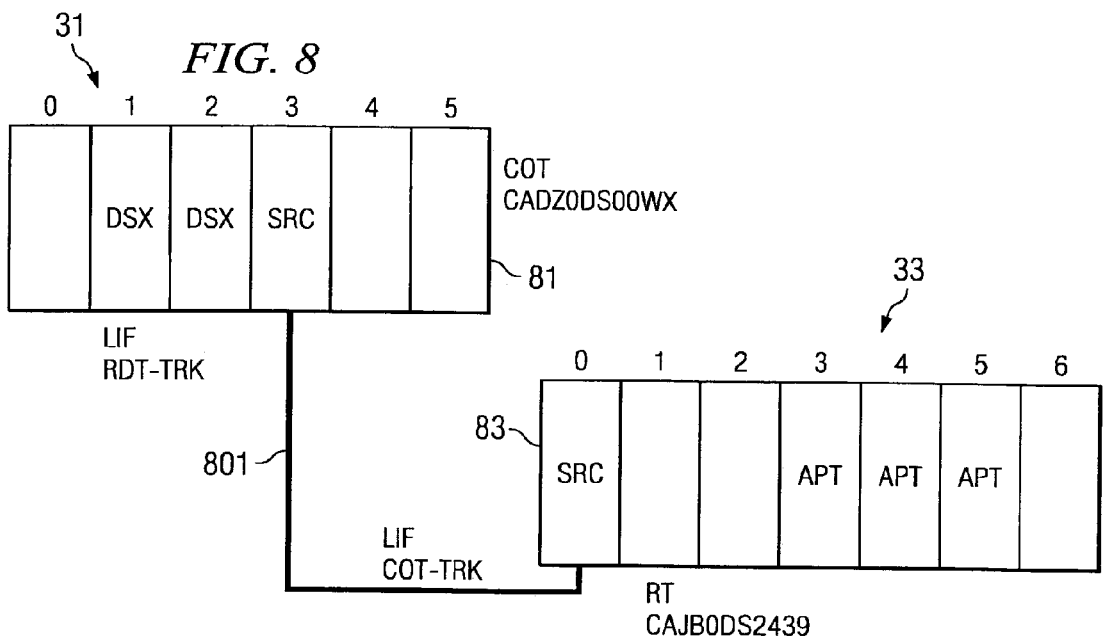
FIG. 8 shows an exemplary physical arrangement of shelves and application packs of equipment FIG. 3.

In order to aid the reader in understanding provisioning procedures according to an embodiment of the present invention, the physical arrangement of shelves and application packs of equipment 31 (here a central office terminal (COT)) and equipment 33 (here a remote terminal (RT)) shown in FIG. 8 will be assumed. Of course, any number of physical arrangements may be accommodated according to the present invention.

In the example shown in FIG. 8, two shelves 81 and 83, of equipment 31 and 33 respectively, connected via trunk link 801, such as may comprise an OC48 trunk. The link between COT shelf 81 and RT shelf 83 in the example of FIG. 8 is supported by the SRC packs of each shelf. For example, an STS-1 trunk interface may have been provisioned between the shelves 81 and 83 which is addressable as LIF RDT-TRK from the COT shelf containing the trunks (shelf 81) and as LIF COT-TRK from the remote terminal shelf containing the trunks (shelf 83). Interface to the LDS in the embodiment of FIG. 8 may be accomplished by connecting DS Is supported by the DSX packs to interfaces on the switch (not shown in FIG. 8). The pair of DSX application packs in shelf 81 may form a protected pair with primary and secondary telecommunications management channel (TMC) and EOC channels being carried on different physical hardware.

It should be appreciated that the application packs providing line interfaces (shown as APT packs of shelf 83) may be deployed anywhere in the network and assigned to any virtual RT. However, in example of FIG. 8 all the line units are supported in a single shelf to simplify the example.

Various assets within the virtual RT configuration are given names which are passed across signaling links. Some of these names can be defaulted by the system. However, others are entered as part of the provisioning, according to a embodiments of the invention. According to preferred embodiments, assets are be named consistently by AID and CLLI, where possible. For example, the APT pack in slot 3 of the RT of FIG. 8 may be named "APT-CAJB0DS2439-3."

Figure 9:
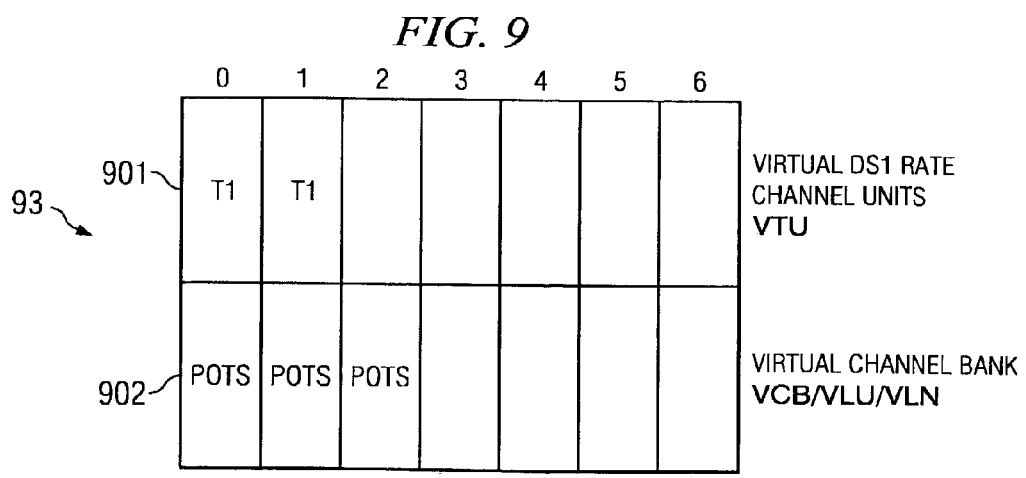
FIG. 9 shows a logical remote terminal configuration corresponding to the physical arrangement of FIG. 8.

The mapping task of a preferred embodiment will take the physical assets of RT 33 and produce a virtual network element that implements a logical RT. For example, logical RT 93 of FIG. 9, comprising shelves 901 and 902, may be mapped according to an embodiment of the present invention. One channel bank shelf of logical RT 93 (e.g., shelf 902) may support the line interfaces while another channel bank shelf of logical RT 93 (e.g., shelf 901) may provide a DS1 rate unit to support trunk interfaces to the LDS.

Configuration of the interfaces may be supported by several AID formats. A supporting AID hierarchy, with modifier types, is shown below.

AP-0 DSX Pack

```
DLC-<DLC Name> Digital Loop Carrier
    IF-<DLC Name>-<IG number> Interface Group
        T1-<Pack>-<Port> DSX Port
    VTU-<DLC Name>-<TU Number> Virtual Trunk Unit
        AP-<Pack> DSX Pack
    VLU-<DLC Name>-<LU number> Virtual Line Unit
        VLN-<DLC Name>-<LU Number>-<Port> Virtual Line
            Instance
```

Steps performed in configuring the central office terminal side of the exemplary configuration of FIG. 8 according to an embodiment of the present invention are shown in FIG. 10. At step 1001 provisioning for particular packs of central office terminal equipment 31 are entered into the system. For example, provisioning may be entered into the system for the DSX packs as follows:
enter pack ap-1 dsx oos
enter pack ap-2 dsx oos At step 1002 a virtual network element is created. For example, a virtual network element digital loop carrier called DLC00 may be created as follows:
enter cot dlc-dlc00 ap-1

The enter command of a preferred embodiment may take a single argument, such as a DSX pack, that will become the primary trunk interface, e.g., the GR303 interface primary L3 signaling unit. According to a preferred embodiment, the primary TMC and EOC for an interface group (IG) provisioned on the remote terminal will reside on this pack.

Step 1003 assigns the packs, here DSX packs, into the virtual remote terminal. According to one embodiment, when a DS1 rate channel unit is assigned to an RT it is called a virtual trunk unit (VTU) and is referenced by the AID verb VTU. Accordingly, assignment of the packs into the virtual remote terminal may be accomplished as follows:
enter vtu vtu-dlc00-0 ap-1
enter vtu vtu-dlc00-1 ap-2

The second modifier in the arguments above is the virtual shelf address of the pack, according to a preferred embodiment. Preferably, each DSX pack that has DS 1 ports that will be assigned to the remote terminal will be configured here.

To allow signaling information to pass between the virtual trunk units, cross-connections are preferably established at step 1004. For example, cross-connections may be established between the primary pack and the secondary pack, between the primary and all other packs, and between the secondary and all other packs as follows:
enter crs vtu vtu-dlc00-0 vtu-dlc00-1 1 1 00

A permanent virtual circuit (PVC) (shown here as $\frac{1}{100}$) is preferably allocated for each of these cross-connections.

At step 1005 an interface group is created. For example, a GR303 interface group may be created in preparation to assigning DS1 facilities to the remote terminal as follows:
enter ig ig-dlc00-0 gr303 oos Step 1006 assigns facilities to the interface group. For example, DS1 facilities may be assigned to the interface group such that the first two DS1s from each pack are assigned to the first four slots in the interface group as follows:
enter ig t1 ig-dlc00-0 1 T1-1-0
enter ig t1 ig-dlc00-0 2 T1-2-0
enter ig t1 ig-dlc00-0 3 T1-1-1
enter ig t1 ig-dlc00-0 4 T1-2-1

According to a preferred embodiment, a single interface group can support 28 DS1 facilities, and each remote terminal can support 4 interface groups.

At this point the network interface side of the remote terminal is configured. Accordingly, at step 1007, the interface group is made available to the LDS according to an embodiment by editing into service as follows:
edit ig ig-dlc00-0 is Step 1008 of the illustrated embodiment creates the line side interfaces. The line side interfaces are preferably created in much the same way as the virtual trunk units. For example, a virtual line unit (VLU) AID may support the creation of virtual application packs in the channel bank shelf as follows:
enter vlu vlu-dlc00-0 apt APT-CAJB0DS2439-3
enter vlu vlu-dlc00-1 apt APT-CAJB0DS2439-4
enter vlu vlu-dlc00-2 apt APT-CAJB0DS2439-5

A name may be assigned to each virtual line unit to allow the signaling stack to uniquely identify the remote line units. It should be appreciated that the naming convention suggested above has been utilized to create the names.

Each line unit is preferably cross-connected to all of the trunk units at step 1009. According to one embodiment, a permanent virtual circuit is preferably assigned for each cross connect and uses the LIF assigned to the STS-1 interconnect between shelves to steer traffic to the physical line units on shelf CAJB0DS2439 as follows:

enter crs vlu vlu-dlc00-0 vtu-dlc00-0 1 101 RDT-TRK
enter crs vlu vlu-dlc00-0 vtu-dlc00-1 1 101 RDT-TRK
enter crs vlu vlu-dlc00-1 vtu-dlc00-0 1 102 RDT-TRK
enter crs vlu vlu-dlc00-1 vtu-dlc00-1 1 103 RDT-TRK
enter crs vlu vlu-dlc00-2 vtu-dlc00-0 1 104 RDT-TRK
enter crs vlu vlu-dlc00-2 vtu-dlc00-1 1 105 RDT-TRK At step 1010 the trunks and packs are preferably brought into service as follows:
edit pack ap-1 is
edit pack ap-2 is
edit port T1-1-0 is
edit port T1-1-1 is
edit port T1-2-0 is
edit port T1-2-1 is At this point the central office terminal side of the virtual remote terminal is fully configured according to the illustrated embodiment. Accordingly, a preferred embodiment proceeds to configure the remote terminal.

FIG. 11 shows steps performed in configuring the remote terminal side of the exemplary configuration of FIG. 8, before adding line instances to the remote terminal, according to an embodiment of the present invention. At step 1101 provisioning for the application packs of the remote terminal equipment is entered into the system, according to one embodiment, as follows:
enter ap-3 apt oos
enter ap-4 apt oos
enter ap-5 apt oos At step 1102 an instance of the digital loop carrier is created on the remote terminal line cards. For example, according to one embodiment an instance of the digital loop carrier is created on each line card that forms part of the digital loop carrier as follows:
enter rdt dlc-dlc00 ap-3
enter rdt dlc-dlc00 ap-4
enter rdt dlc-dlc00 ap-5

Step 1103 of a preferred embodiment assigns a signaling name to the, remote terminal application packs. For example, a signaling name may be assigned to each application pack as follows:
enter rdt sig ap-3 APT-CAJB0DS2439-3
enter rdt sig ap-4 APT-CAJB0DS2439-4
enter rdt sig ap-5 APT-CAJB0DS2439-5

According to the preferred embodiment, the names match the assignment of packs to the virtual line unit shelf locations (see step 1008 of FIG. 10 above).

At step 1104 cross connections are established between physical lines and virtual channel banks according to the illustrated embodiment. For example, cross-connects between the physical line unit and the virtual channel bank may be set up as follows:
enter crs vcb ap-3 dlc-dlc00 T1-CADZ0DS00WX-3 1 101 COT-TRK
enter crs vcb ap-3 dlc-dlc00 T1-CADZ0DS00WX-3 1 102 COT-TRK
enter crs vcb ap-4 dlc-dlc00 T1-CADZ0DS00WX-4 1 103 COT-TRK
enter crs vcb ap-4 dlc-dlc00 T1-CADZ0DS00WX-4 1 104 COT-TRK
enter crs vcb ap-5 dlc-dlc00 T1-CADZ0DS00WX-5 1 105 COT-TRK
enter crs vcb ap-6 dlc-dlc00 T1-CADZ0DS00WX-5 1 106 COT-TRK The names and permanent virtual circuits set up in step 1009 of FIG. 10 are assigned to the physical line units according to the preferred embodiment.

At step 1105 the application packs are preferably brought into service as follows:
edit pack ap-3 is
edit pack ap-4 is
edit pack ap-5 is Bringing the application packs into service completes the provisioning of a remote terminal according to the illustrated embodiment of the invention.

According to a preferred embodiment of the invention, after provisioning the central office terminal and remote terminals, as described above, line instances are preferably provisioned with respect to the remote terminal. For example, according to one embodiment of the present invention virtual line network (VLN) line AIDs map one to one with the AIDs supported by the application pack. Accordingly, in such an embodiment all that is required to assign a line to the remote terminal is to set the interface group and CRV. The following example assigns loop 10 on APT-CAJB0DS2439-3 to be in interface group 0 using CRV 50.
enter vln vln-dlc00-0-10 ig-dlc00-0 50

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of provisioning subscriber services in a communication system having a plurality of subscribers, said method comprising:
    receipt by an operations support system of a provisioning instruction with respect to a particular service condition for a specific subscriber, said operations support system not containing within it instructions pertaining to certain equipment which could be utilized to provide said specific subscriber with said particular service;
    said operations support system issuing an instruction to a network connected to said specific subscriber, said instruction being such that it is directed to a specific piece of equipment which provides said particular service condition to said specific subscriber, even though said specific piece of equipment is not present with respect to said specific subscriber; and
    at a location within said network intercepting said issued instruction and translating said intercepted instruction in a manner to accomplish said particular service condition with equipment not identifiable by said operations support system.

2. The method of claim 1 wherein said particular service condition is a test for proper operation of said particular service at said specific subscriber's physical location.

3. The method of claim 1 wherein said particular service is provided to at least some of said subscribers by equipment which is known to said operations support system and wherein said particular service is provided to said specific subscriber by an other than said known equipment.

4. A telephone network system in which an operations support system is operable for provisioning subscribers without said operations support system being programmed to recognize the network equipment used to provide communication service to certain of said subscriber, said system comprising:
   a system local to a group of said subscribers, said system operable for controlling traditional network services to said group of subscribers using non-traditional equipment, said non-traditional equipment not within the provisioning capabilities of said operations support system; and
   said local system comprising means for performing at least one translation of a received service provisioning instruction from said operations support system directed to a specific subscriber within said group of subscribers controlled by said local system, said translation operable for converting a legacy provisioning instruction from said operations support system to one or more instructions appropriate for controlling the actual equipment servicing said specific subscribers.

5. The system of claim 4 wherein said traditional network service is a test for proper operation of the communication service to said specific subscriber.

6. The system of claim 5 wherein said local system translates instructions between said operations support system and equipment providing communication service to said specific subscriber.

7. The system of claim 4 wherein said communication service is provided to at least some of said subscribers by analog transmission in a manner known to said operations support system and wherein said service is provided to said specific subscriber in other than traditional analog fashion.

8. A system local to a group of subscribers in a network of subscribers where an operations support system is used to provision services to all of said subscribers using a set of provisioning instructions; said system comprising:
   means for translating a provisioning instruction from said operations support system, said provisioning instruction directed to a specific subscriber station within said group; and
   means operative under control of said translation means for enabling with respect to said specific subscriber station the service corresponding to said provisioning instruction even through the equipment delivering said service is different from the equipment expected by said operations support system.

9. The system of claim 8 wherein said translation means further comprises:
   means for sending to said operations support system information requested by said operations support system, said information being sent in a format expected by said operations support system even though said information is not available at said local system in said expected format.

10. A method of provisioning subscriber services in a communication system having a plurality of subscribers, and wherein, upon receipt by an operations support system of a provisioning instruction with respect to a particular service condition for a specific subscriber, the operations support system issues an instruction via a network connected to a said specific subscriber, said instruction being such that it is directed to a specific piece of equipment which would typically provide said particular service condition to said specific subscriber, said method comprising:
   at a location within said network intercepting said issued instruction, translating intercepted ones of said instructions so as to enable alternate equipment to provide said particular service condition to said specific subscriber; and
   sending confirmation information to said operations support system as a set of responses conducted by said operations support system even though said responses are not initially in an understood form with said location.

11. The method of claim 10 wherein said particular service condition is a test for proper operation of the communication service to said specific subscriber.

12. The method of claim 11 wherein said local system translates instructions between said operations support system and equipment providing communication service to said specific subscriber.

13. The method of claim 10 wherein said communication service is provided to at least some of said subscribers by analog transmission in a manner known to said operations support system and wherein said service is provided to said specific subscriber in other than traditional analog fashion.

14. A method operating locally to a group of subscribers in a network of subscribers where a central operations support system is used to provision services to subscribers spread over a large geographic area using a set of provisioning instructions common to all of said subscribers; said method comprising the steps of:
   translating a provisioning instruction from said operations support system, said provisioning instruction directed to a specific subscriber station within said group; and
   under control of said translated provisioning instructions, enabling with respect to said specific subscriber station the service corresponding to said provisioning instruction even through the equipment delivering said service is different from the equipment expected by said operations support system.

15. The method of claim 14 wherein said translation step further comprises:
   returning to said operations support system information requested by said operations support system, said information returned in a format expected by said operations support system even though said information is not available at said local group of subscribers in said expected format.

* * * * *